Figure 1:
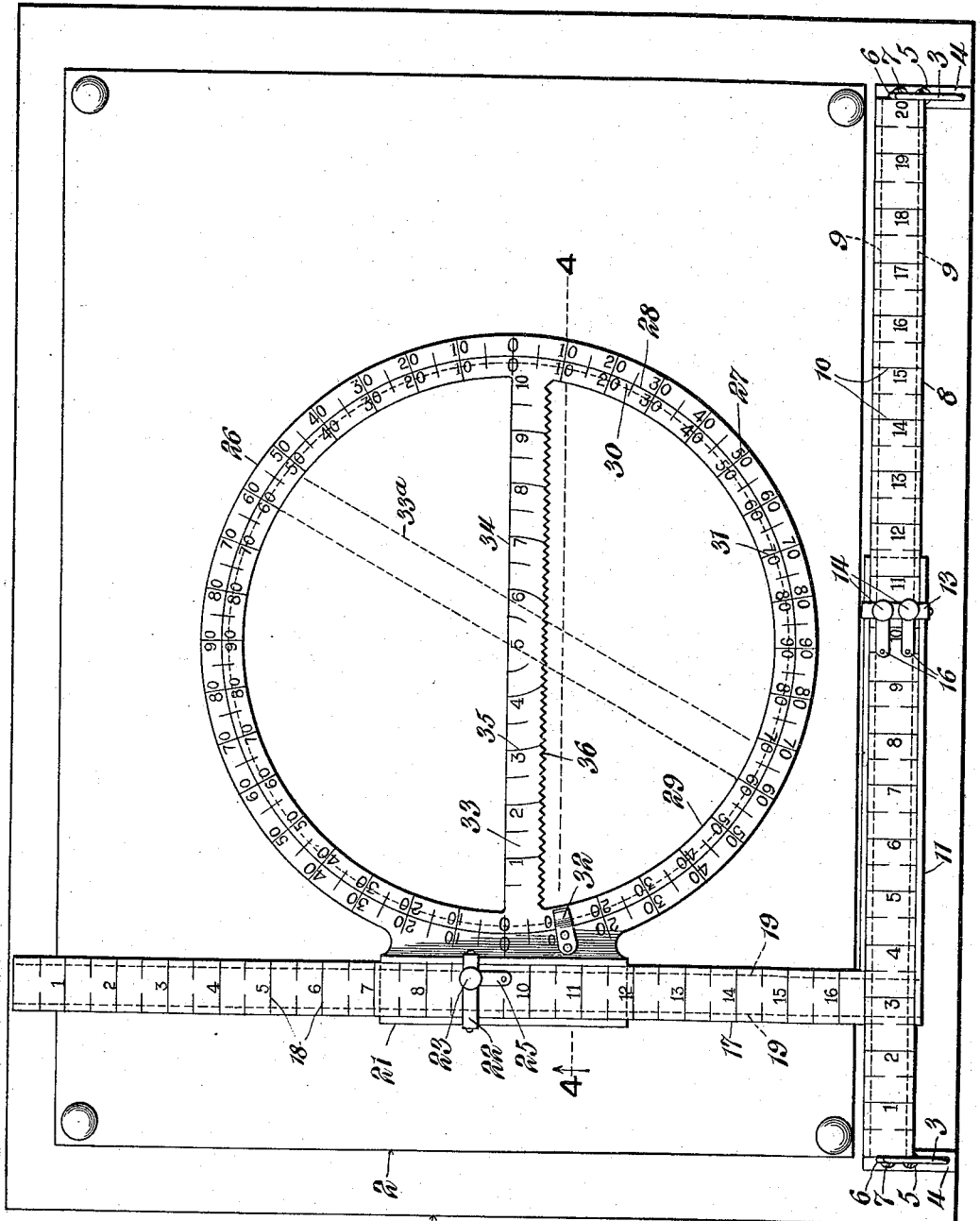

J. & S. A. WIKBERG.
DRAFTING INSTRUMENT.
APPLICATION FILED FEB. 11, 1915.

1,167,237.

Patented Jan. 4, 1916.
2 SHEETS—SHEET 1.

WITNESSES
Howard D. Orr.
H. F. Chapman.

INVENTORS
Johan Wikberg
and Samuel A. Wikberg,
BY E. G. Siggers
ATTORNEY

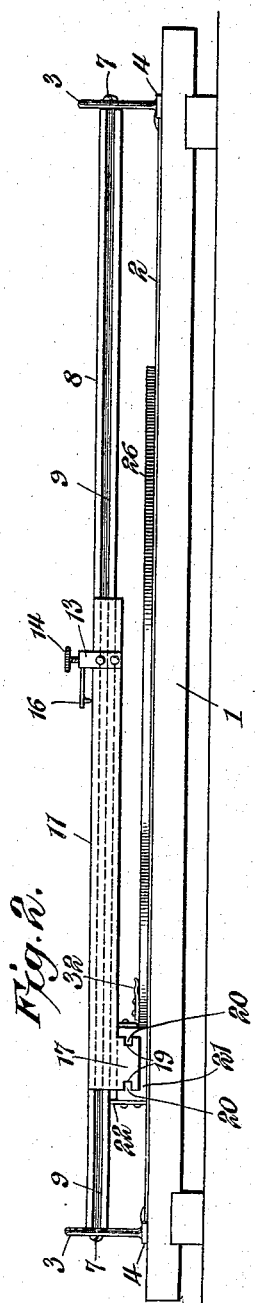

UNITED STATES PATENT OFFICE.

JOHAN WIKBERG AND SAMUEL A. WIKBERG, OF TANGLE FLAGS, SASKATCHEWAN, CANADA.

DRAFTING INSTRUMENT.

1,167,237.  Specification of Letters Patent.  Patented Jan. 4, 1916.

Application filed February 11, 1915. Serial No. 7,585.

*To all whom it may concern:*

Be it known that we, JOHAN WIKBERG and SAMUEL A. WIKBERG, subjects of the King of Great Britain, residing at Tangle Flags, Province of Saskatchewan, Canada, have invented a new and useful Drafting Instrument, of which the following is a specification.

This invention has reference to drafting instruments, and its object is to provide an instrument whereby a line may be quickly and accurately calculated and drawn at any angle, and arcs or circles described without the use of tee and set squares and compasses.

In accordance with the present invention a straight edge is diametrically and rotatably mounted within a circular protractor which in turn is carried by and slidably arranged along a scale beam, and the latter is slidably mounted on and at right angles to a scale stock having means for attachment to a drawing board.

The invention will be best understood from a consideration of the following detailed description taken in connection with the accompanying drawings forming a part of this specification, with the further understanding that while the drawings show a practical form of the invention, the latter is not confined to any strict conformity with the showing of the drawing, but may be changed and modified so long as such changes and modifications mark no material departure from the salient features of the invention.

In the drawings: Figure 1 is a plan view of the instrument of the present invention applied to a drafting board. Fig. 2 is an elevation of the structure of Fig. 1 as viewed from the lower side thereof. Fig. 3 is an elevation of the structure of Fig. 1 as viewed from the left hand side thereof. Fig. 4 is a section on the line 4—4 of Fig. 1. Fig. 5 is a perspective view of one end of the scale stock showing a supporting bracket therefor. Fig. 6 is an edge view of a portion of the scale stock with the end to which the bracket is attached shown in longitudinal section. Fig. 7 is a detail view of one of the clamp screws and indicators.

Referring to the drawings there is shown a drawing board 1 having a sheet 2 of drawing paper attached thereto. Near one edge of the drawing board adjacent to the ends of the board brackets 3 are attached. These brackets may consist of wire overhang members each rising from a plate 4 designed to be secured to the drawing board by a screw 5. That end of the bracket remote from the plate 4 is returned toward said plate and terminates in an eye 6 which by means of a screw 7 is made fast to the corresponding end of an elongated scale stock 8 having longitudinal grooves 9 formed in its opposite edges. The scale stock may be made of wood or metal and is provided on the upper or visible surface with serial or other graduations 10. By the employment of a single screw 7 extending through the eye 6 of the bracket 3 at each end of the scale stock and locating these screws midway of the width of the stock, the latter is pivotally supported.

Mounted to slide along the scale stock 8 is an elongated block 11 having tongues 12 taking into the grooves 9 of the scale stock, and this block underrides the scale stock. Fast to and extending across the block 7 above the scale stock 8 is a yoke or bridge piece 13 through which are threaded thumb screws 14 each carrying pivot ends 15 which may be set against the upper face of the scale stock to hold the block 11 in any position of adjustment along the scale stock. The bridge piece 13 also carries indicator fingers 16 providing an accurate means for setting the block 11 at any place along the scale 10 marked on the upper face of the scale stock.

At that end of the block 11 remote from the bridge piece 13 there is firmly fixed to said block a scale beam 17 having a scale 18 on its upper or visible face. The scale beam 17 is set at right angles to the scale stock 8 and to the block 11 carrying the scale beam and slidable along the scale stock. The beam 17 is in underriding relation to the stock 8 and extends closer to the paper 2 or board 1 than does the stock 8. The scale beam 17 has longitudinal side grooves 19 similar to the scale stock and fitted to these grooves are tongues 20 on a block 21 underriding the scale beam. This block 21 is similar to the block 11 and is provided with a yoke or bridge 22 extending across it and carrying a thumb screw 23 threaded through it and terminating in a pivot end 24 by means of which the block 21 is secured at any desired point of adjustment along the scale beam 17. An indicating finger 25 carried by the bridge 22 serves as a means for accurately locating the block 21 along the scale beam 17.

Formed on or effectively in one piece with the block 21 is a circular protractor 26 extending laterally from the scale beam in such position as to lie close to the drawing board. The protractor has a scale 27 thereon which may be divided into degrees and has an interior annular recess or rabbet 28 in which is fitted a ring 29 having a peripheral flange 30 seated in the rabbet. The ring 29 is also provided with a scale 31 which may be divided into degrees. The ring 29 may be turned in the protractor to any desired position, being held against escape therefrom by a friction spring 32 fast to the protractor and having its free end bearing upon the ring. Extending across the ring is a straight edge or rule 33 with one edge 34 thereof in a diameter of the ring. This straight edge is provided with a suitable scale 35, while the edge of the straight edge remote from the edge 34 is formed with notches 36 properly located to correspond to arcs struck from the axis of the ring at the edge 34.

The scale stock 8 being pivoted in its longitudinal center line permits the instrument of the present invention being tilted toward and from the drawing paper on the board and when the device is brought into contact with the drawing paper it lies flat thereon.

In using the instrument the scale stock provides a means for measuring all distances along the drafting board and is most convenient in checking up work done on the board where over-all or total measurements of a number of detail parts is required. The scale stock further always assures the scale beam being set at right angles thereto, so that the beam may be used for vertical measurements.

The rule secured across the protractor ring may be used to draw any line required at any place on the board by moving the beam toward one side or the other of the board and by moving the protractor with its sliding block lengthwise of the beam. The rule or straight edge 33 may be turned with the ring to any angular position, such as shown in dotted lines at 33ª in Fig 1, the exact angle being indicated on the protractor.

The rule may be used for describing any arc or circle without compasses, since the ring with the rule is readily rotated about the protractor, and the pencil may have its point in any notch 36 on the notched edge of the rule. The distance of the pencil from the center or axis of rotation of the ring is indicated by the scale 35, wherefore the pencil point touching the paper may be moved ahead with the rule or straight edge to describe a circle or any part thereof.

The indicator points on the fingers 16 and 25 are in alinement respectively with the center of the protractor, so that any point of the drafting board may be accurately and readily located.

What is claimed is:—

1. A drafting instrument comprising a scale stock, a scale beam movable therealong and disposed at right angles to the stock, a rotatable ring and carrying means therefor on and movable along the scale beam, and a rule extending across the ring and rotatable therewith.

2. A drafting instrument comprising a scale stock, a scale beam supported at right angles to said scale stock and adjustable therealong, a ring and supporting means therefor on and adjustable along the scale beam, and a rule supported across and rotatable with said ring with one edge of the rule in a diameter of the ring.

3. A drafting instrument comprising a scale stock, a scale beam thereon and adjustable therealong and arranged at right angles thereto, a protractor carried by the scale beam and adjustable therealong, and a ring carried by the protractor and having a rule extending thereacross with one edge in a diameter of the ring and rotatable with the ring into different positions of angular adjustment.

4. A drafting instrument comprising a scale stock with pivotal supports adapted to be secured to a drafting board, a scale beam at right angles to the scale stock and adjustable lengthwise of the latter, a circular protractor carried by and adjustable along the scale beam and projecting laterally therefrom, and a ring rotatably supported within the protractor and provided with a rule extending diametrically across said ring.

5. A drafting instrument comprising a a pair of brackets, a scale stock pivotally supported between said brackets, a scale beam right-angularly supported from said scale stock and adjustable therealong, a circular protractor supported laterally from said beam, a ring rotatably supported within said protractor, and a rule diametrically supported across said ring.

6. A drafting instrument comprising a scale stock having grooved sides, a beam block having tongues fitting the grooves of the stock and slidable therealong, a thumb screw carried by the beam block and adjustable against the scale stock, a scale beam secured at one end of the block at right angles thereto and having grooved sides, another block carried by the scale beam and provided with tongues entering the grooves, said block being slidable along the scale beam, a thumb screw carried by said block and adjustable against the beam, a circular protractor carried by and extending laterally from the last-named block, a ring rotatable within said protractor, and a rule extending diametrically across the ring.

7. A drafting instrument comprising a scale stock, a scale beam supported at right angles to said scale stock and adjustable therealong, a ring and supporting means therefor adjustable along the scale beam, and a rule extending across the ring and rotatable therewith and having one edge thereof scaled and in diametrical position across the ring and the opposite edge thereof notched and scaled from the center of the ring in accordance with the scale on the opposite edge.

8. A drafting instrument comprising scale members at right angles one to the other with one of the scale members movable on the other, a protractor carried by and movable lengthwise of the second-named scale member, and a ring carried by and rotatable in the protractor and provided with a diametric rule having one edge in a diameter of the ring and the other edge notched, said rule being also provided with a scale and the notches conforming in position to the scale.

9. A drafting instrument having scale members at right angles one to the other with one of the scale members slidable lengthwise of the other, carrying means mounted on and slidable along the slidable scale member and a rule rotatably mounted on the carrying means, said rule having one edge traversing its axis of rotation and the other edge notched and said rule being provided with a scale on the first-named edge with the notches conforming in position to said scale as continued from the axis of rotation of the rule.

10. A drafting instrument comprising a scale stock, a scale beam slidable lengthwise of the stock and projecting at right angles thereto, a protractor ring carried by the scale beam and slidable lengthwise thereon, and another ring mounted in the protractor ring and provided with a rule extending thereacross with one edge of the rule in a diameter of the ring and the other edge notched with the notches conforming in position to the corresponding ends of arcs struck from the axis of rotation.

11. A drafting instrument comprising a scale stock, a scale beam slidable lengthwise of the stock and projecting at right angles thereto, a protractor ring carried by the scale beam and slidable lengthwise thereof, and another ring mounted in the protractor ring and provided with a rule extending thereacross with one edge of the rule in a diameter of the ring and the other edge notched with the notches conforming in position to the corresponding ends of arcs struck from the axis of rotation, the protractor ring and the slidable scale beam having indicators located in alinement with the axis of rotation of the ring.

12. A drafting instrument comprising a scale stock, a scale beam slidable lengthwise of the stock and projecting at right angles thereto, a protractor ring carried by the scale beam and slidable lengthwise thereof, and another ring mounted in the protractor ring and provided with a rule extending thereacross with one edge of the rule in a diameter of the ring and the other edge notched with the notches conforming in position to the corresponding ends of arcs struck from the axis of rotation, the protractor ring and the slidable scale beam having indicators located in alinement with the axis of rotation of the ring, and the scale stock being provided with pivotal supports adapted to be attached to a drafting board whereby the instrument may be rocked upon an axis longitudinal of the scale stock.

In testimony, that we claim the foregoing as our own, we have hereto affixed our signatures in the presence of two witnesses.

JOHAN WIKBERG.
SAMUEL A. WIKBERG.

Witnesses:
BEATTA VINGER,
B. BALLERUD.